No. 642,540. Patented Jan. 30, 1900.
F. TOUSIGNANT & P. LARANGE.
PEGGING MACHINE.
(Application filed May 6, 1899.)
(No Model.) 2 Sheets—Sheet 1.

Witnesses: Horace T. Deitz

Francis Tousignant, Pierre Larange, Inventors,
By Marion & Marion
Their Attorneys.

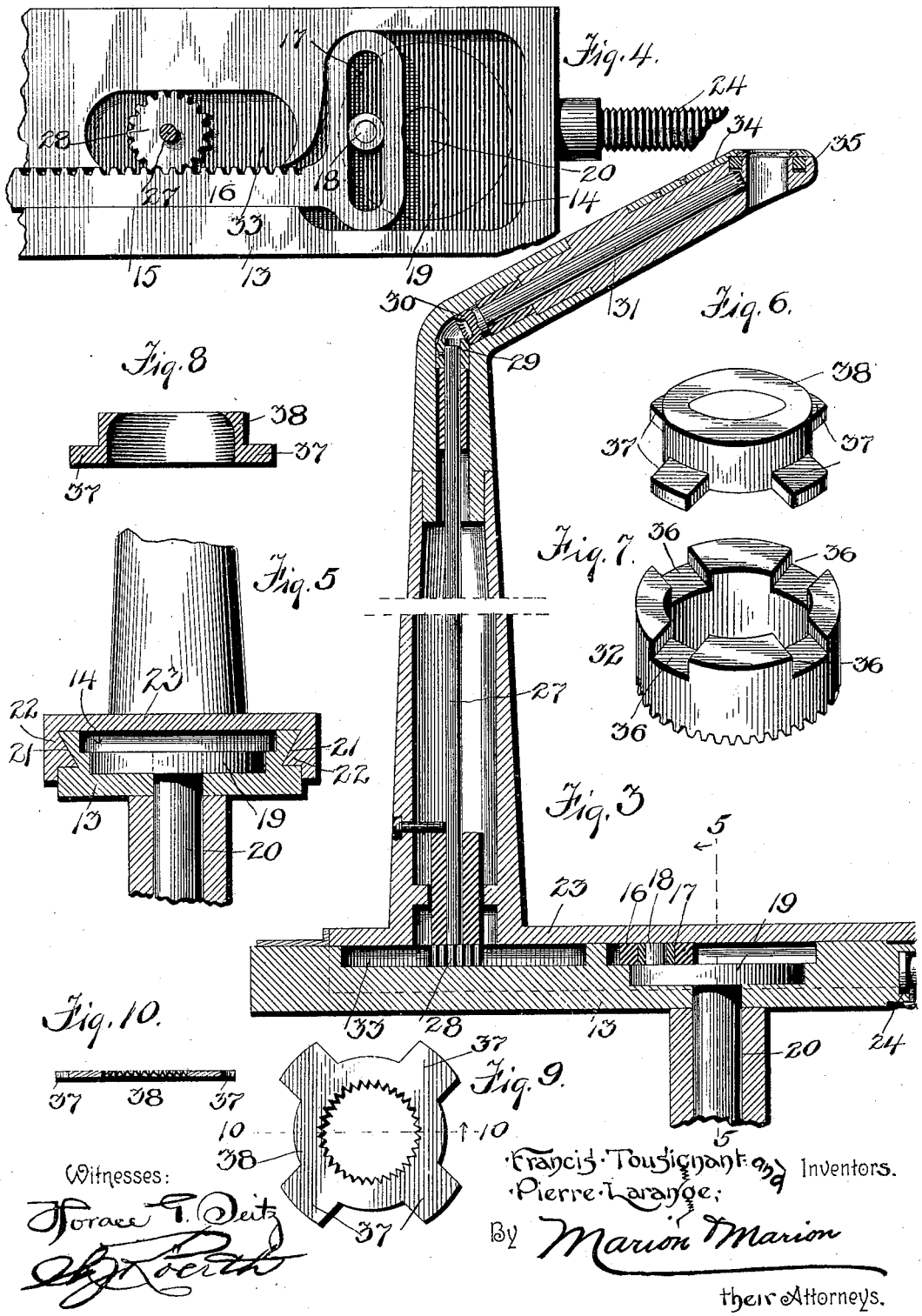

UNITED STATES PATENT OFFICE.

FRANCIS TOUSIGNANT AND PIERRE LARANGE, OF ST. HYACINTHE, CANADA.

PEGGING-MACHINE.

SPECIFICATION forming part of Letters Patent No. 642,540, dated January 30, 1900.

Application filed May 6, 1899. Serial No. 715,897. (No model.)

*To all whom it may concern:*

Be it known that we, FRANCIS TOUSIGNANT, a citizen of the United States of America, and PIERRE LARANGE, a subject of Her Majesty the Queen of Great Britain, both residing at St. Hyacinthe, county of St. Hyacinthe, Province of Quebec, Canada, have invented certain new and useful Improvements in Pegging-Machines; and we do hereby declare that the following is a full, clear, and exact description of the invention, such as will enable others skilled in the art to which it appertains to make and use the same.

Our invention relates to improvements in pegging-machines.

One object of our invention is to provide a construction in which the horn is adjustably mounted on its support, thus enabling the use of tips of different sizes to allow of supporting the shoe during operation in a better manner.

A further object is to provide a trimming attachment for machines of this character in which the trimmer is given an oscillatory movement.

A further object is to provide a trimmer which is simple and efficient in operation, durable in construction, and which can be made at an extremely low cost.

To these and other ends our invention consists in the improved construction and combination of parts hereinafter fully described, and particularly pointed out in the appended claims.

Figure 11:
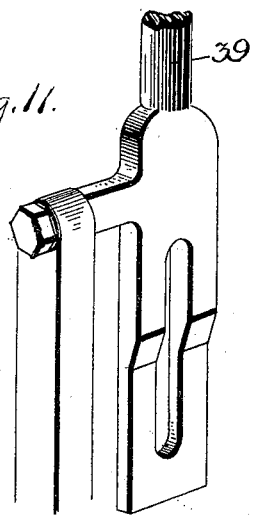
Figure 1:
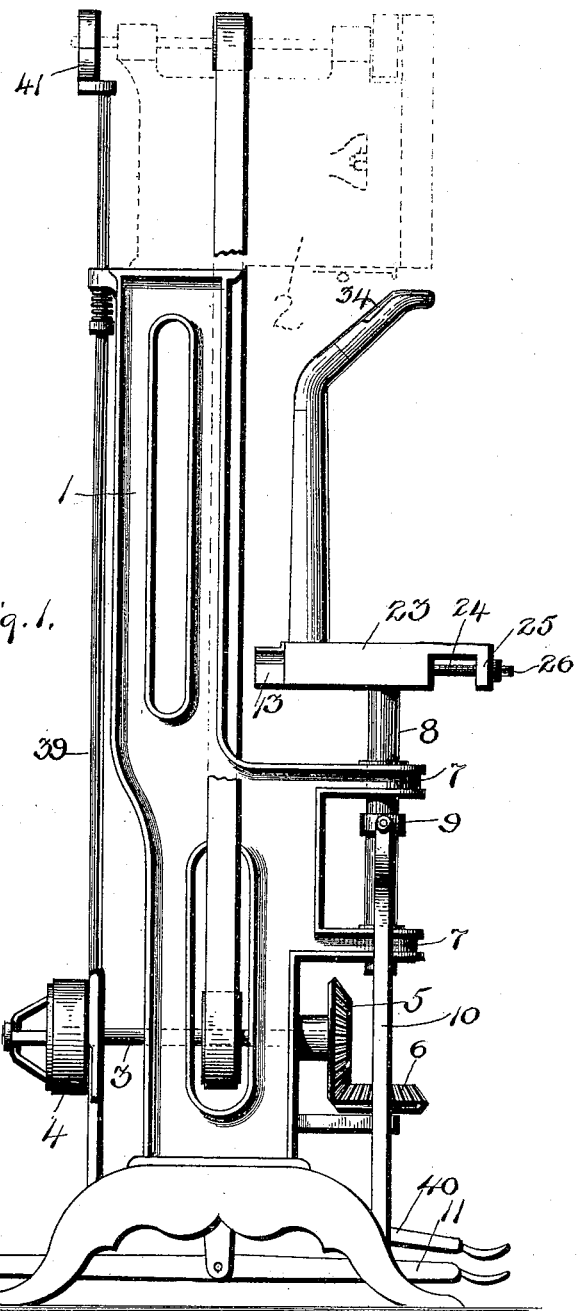
Figure 2:
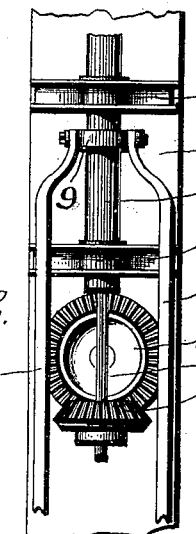

In the accompanying drawings, forming a part of this specification, and in which similar numerals of reference indicate similar parts in all of the views, Figure 1 is a side elevation of a pegging-machine, showing our improvement in position thereon. Fig. 2 is a fragmentary front elevation of the machine. Fig. 3 is a vertical longitudinal sectional view of the horn, showing our improvement in position therein. Fig. 4 is a plan view of the lower member of the horn-support, showing the mechanism for imparting the oscillatory movement to the trimmer. Fig. 5 is a cross-sectional view taken on the line 5 5 of Fig. 3. Fig. 6 is a detail of one form of trimmer. Fig. 7 is a detail of the gear which receives and retains the trimmer. Fig. 8 is a cross-sectional view of the trimmer shown in Fig. 6. Fig. 9 is a plan view of a modified form of trimmer. Fig. 10 is a cross-sectional view taken on the line 10 10 of Fig. 9. Fig. 11 is a detail of a portion of the rod which serves to place the machine into and out of operation and at the same time applying the brake.

The present invention, while belonging to the class of pegging-machines, has no particular relation to the mechanism for forming or driving the pegs, having more particular relation to the peg-trimming mechanism and the construction of the horn which serves to support the shoe during the pegging operation. There have been a number of constructions designed to accomplish this purpose, in which the extending portion of the peg is driven in contact with a revolving knife or saw by the feed movement of the peg-driving mechanism; but these mechanisms being such as will impart a rotary movement to the trimmer, it will be readily seen that the trimmer when formed in the nature of a saw will trim in one direction only, which serves to quickly wear out the trimmer, as well as causing the cutting-teeth to become quickly dulled, as there is no release while the machine is in operation. In addition to this the mechanism required to impart the rotary movement to the trimmer will not allow of the formation of an adjustable horn. This is disadvantageous by reason of the fact that in some forms of shoes better workmanship can be obtained by the use of a head which is smaller, while again other styles of shoes can best be manipulated on an elongated head or tip. As the point where the peg is driven must necessarily remain the same, it is obvious that where a mechanism is provided capable of being moved to varying positions, and thus allow of the use of various-sized tips, such construction is exceedingly advantageous.

The construction hereinafter described is designed to provide a trimming attachment which will have an oscillatory movement. The advantage of such movement over the rotary movement is plainly seen when it is stated that in the oscillatory-moving trimmer both faces of the tooth are used for cutting, thus prolonging the life of the cutter, in addition to which the operating mechanism is capable of being greatly simplified and of inexpensive construction.

Another feature of our invention is the construction of the trimmer itself, the form being such as will enable us to use a trimmer of exceedingly small size, thus forming a more substantial support for the sole of the shoe while the awl and pegs are being driven.

1 designates the supporting-frame, to the top of which is secured the pegging-head 2, the latter being shown in the drawings in dotted lines, the construction shown being simply a conventional form of head, the particular construction of head forming no part of the present invention, the invention being applicable to different forms of pegging-heads.

The pegging mechanism receives its power from a suitable drive-shaft 3, driven by means of a suitable pulley 4, connected by belting or otherwise with the source of power, the shaft 3 extending forwardly through the frame 1 and having at its outer end a suitable beveled gear 5, adapted to coact with and operate a similar gear 6, mounted on the frame. The frame 1 is provided with forwardly-extending brackets or supports 7, within which is mounted to have a vertical movement a suitable sleeve 8, having a collar 9, to which are connected downwardly-extending arms 10, secured to a treadle 11, the latter being provided with a suitable weight 12, which serves to normally hold the front end of the treadle 11 in its upper position. By this construction it will be readily seen that when the treadle 11 is pressed downward by the foot of the operator the sleeve 8 will be caused to be drawn downwardly within the bracket 7, carrying with it the mechanism which is attached to or secured within said sleeve. As soon as the foot of the operator passes from the treadle the weight 12 will immediately cause the front end of the treadle to be raised, which in turn serves to move the sleeve 8 upwardly, carrying with it all accessories which are attached thereto.

Secured to the upper end of the sleeve 8 is the lower member of the horn-support, said member (designated in the drawings as 13) being formed substantially as shown in Figs. 4, 3, and 5. As shown, the member 13 is provided with a recess 14, communicating with an elongated recess 15, said recess and elongated recess being adapted to receive a sliding rack-bar 16, having its inner end elongated at right angles to the rack portion, said elongated portion being provided with a slot 17, within which a suitable pin and roller 18 are adapted to have movement, said pin and roller being connected to the upper face of a disk 19, mounted within the lower member 13, the mounting of said pin and collar being eccentric to the center of movement of said disk. The disk 19 is secured to the upper end of a vertical shaft 20, which extends downwardly through the sleeve 8 and is connected by means of a suitable spline with the beveled gear 6, by means of which the shaft 20 will continue its movement regardless of the vertical position of the sleeve 8 and shaft 20. By this construction it will be seen that as the gear 6 is revolved by the gear 5 the shaft 20 will be given a rotary movement, which serves to impart a similar movement to the disk 19, which, through the pin and collar 18, serves to impart a reciprocating movement to the rack-bar 16 in an obvious manner. The member 13, as shown in Fig. 5, is provided with dovetailed grooves 21 on its opposite side, within which grooves are adapted to be passed the tongues 22, formed on the upper member 23 of the horn-support. The member 13 is provided with a suitable screw-threaded pin 24, which passes through an extension 25, formed at the outer end of the member 23, said pin serving to move the member 23 on its slide when the pin 24 is rotated by means of a suitable wrench, a nut 26, mounted on said screw-threaded pin 24, serving to hold the member 23 in its adjusted position. The member 23 is preferably formed as shown in Fig. 3, having a vertically-extending shaft 27, the lower end of which is provided with a suitable gear 28, which is adapted to contact with and be operated by the rack-bar 16. The upper end of the shaft 27 is provided with a suitable spur-gear 29, which is adapted to coact with a similar gear 30, formed on the shaft 31, which is mounted within an angular extension formed on the member 23, this extension being removable and formed in sections, which construction allows of the substitution of a longer or shorter tip-section, as may be desired. The end of the shaft 31, which is located at the tip or head of the horn, is provided with spur-teeth, which are adapted to contact with and operate a suitable gear 32, formed substantially as shown in Fig. 7. The member 23 and its vertically-extending portion are provided with suitable bearings, which serve to hold the shaft 27 in its proper position within said vertical portion regardless of the position of the member 23 on the slide 15, the gear 28 being moved longitudinally of the member 13 when the upper member 23 is moved back by the screw-threaded pin 24, the gear 28 being located within a suitable elongated recess 33, formed in the member 13. By this construction it will be seen that as the rack-bar 16 is reciprocated in its slide it will impart a rotary movement to the gear 28, which, through its connections, as hereinbefore explained, will impart a similar movement to the spur-gear 32, the movement of the gear 32 being in opposite directions, or an oscillatory movement, by reason of the fact that the bar 16 moves backward and forward, thus imparting a movement in opposite directions to the gear 28.

The tip or head of the horn is formed substantially as shown in Fig. 3, having its upper face formed on a horizontal plane, on which is adapted to be placed the removable cap 34, said cap serving to hold the gear 32 and the trimmer, hereinafter described, in position. The gear 32 is mounted within a concentric recess 35, formed in the head of the horn, the end of the shaft 31 extending into said recess in order that the spur-gear toothed end of said shaft may engage with and operate said gear.

As shown in Fig. 7, the gear 32 is provided with radially-extending recesses 36, said recesses being adapted to receive radially-extending lugs 37, formed on the trimmer 38. As shown in Fig. 7, the upper face of the gear 32 is flat, the recesses 36 being of sufficient depth only to allow the lugs 37 to fit snugly therein, said lugs serving to completely fill said recesses, thus making its upper face flush for its entire top.

The trimmer may be formed in several ways, the preferred form being shown in Figs. 9 and 10, in which the trimmer is designated as 38, the lugs being shown at 37. In this form the trimmer is substantially thin, being simply of the thickness of the lugs 37. In the form shown in Figs. 6 and 8 the trimmer designated as 38ᵃ is of greater thickness than the preferred form, the lugs, however, shown at 37ᵃ being of the same thickness as the lugs 37. In each case, however, the same principle is involved, the forms being made substantially in the form of a washer having its upper and lower surface in parallel planes. As shown in these figures, the upper face of the trimmer is made flat, this construction enabling the use of a cap, which is secured to the horn, the cap being of slight thickness, the cutting edge to pass to a point but an exceedingly small distance below the top plane of the cap. The trimmer 38 is formed with either a knife cutting edge, as shown in Figs. 6 and 8, or with a saw-toothed edge, as shown in Figs. 9 and 10. This refers only to the cutting edge, it being readily understood that either cutting edge may be applied to either form of trimmer.

As will be seen by referring to Figs. 9 and 10, the construction there presented is exceedingly simple, being nothing more than an ordinary washer having the radially-extending lugs 37 and either the saw-tooth edges or the knife cutting edges.

The operation of our improved mechanism is believed to be clearly set forth herein, excepting as to the general operation of pegging-machines, and as the general operation is similar to machines of this type heretofore patented a detailed description is not given.

In the construction shown in Figs. 1 and 11 the rod 39 has its lower end arranged substantially as shown in Fig. 11, which serves to throw the wheel 4 into and out of contact with the friction-clutch, said rod being operated by means of a suitable treadle 40, the upper end of said rod 39 being provided with a suitable brake 41, which serves to instantly stop the machine when the power is taken therefrom.

The advantages of this construction are many and are believed to have been clearly set forth heretofore.

While we have herein shown a preferred form of carrying our invention into effect, yet we do not desire to limit ourselves to such preferred details of construction, but claim the right to use any and all modifications thereof which will serve to carry into effect the objects to be attained by this invention, in so far as such modifications and changes may fall within the spirit and scope of our said invention.

We claim—

1. The combination with a pegging-machine; of a vertically-moving horn-support, said support also having a pivotal movement; a member located on and having movement with said support; an upper member removably secured on said member, said upper member carrying the shoe-horn, said member and upper member being adjustable relatively to each other horizontally, whereby horn-tips of various sizes may be used interchangeably without varying the alinement of the mechanism contained within the end of the horn relatively to the pegging mechanism; means for retaining said member and upper member in their adjusted position relatively to each other; and peg-trimming mechanism carried by and operated within said horn.

2. The combination with a pegging-machine; of a vertically-moving horn-support, said support also having a pivotal movement; a member located on and having movement with said support; an upper member removably secured on said member said upper member carrying the shoe-horn, said member and upper member being movable longitudinally relatively to each other; an adjusting-screw carried by said members, adapted to adjust the position of said members relatively to each other, whereby horn-tips of various sizes may be used interchangeably without varying the alinement of the mechanism contained within the end of the horn relatively to the pegging mechanism, said adjusting-screw serving to retain said members in their adjusted position; and peg-trimming mechanism carried by said horn.

3. The combination with a pegging-machine; of a horn-support mounted to have a vertical and rotary movement; a horn, carrying a peg-trimmer, secured on said horn-support, said trimmer being mounted to move in the plane of its cutting edge; and means, mounted within said horn and support, for imparting an oscillatory movement to said peg-trimmer, said trimmer trimming the pegs during its movement in both directions.

4. A trimming attachment for pegging-machines, comprising a horn-support; a reciprocating rack-bar mounted therein; a horn secured to said support; a circular peg-trimmer mounted at the end of said horn; and gearing operatively connected to said rack-bar and said peg-trimmer, whereby the movement of said rack-bar in one direction will impart a rotary movement to said peg-trimmer, the complete movement of said rack-bar, imparting movement to said trimmer in opposite directions and causing the entire cutting-surface of said trimmer to come into active use.

5. A trimming attachment for pegging-machines, comprising a horn-support; a reciprocating rack-bar mounted therein; revoluble means for imparting movement to said rack-bar; a horn secured to said support; a circular peg-trimmer mounted at the end of said horn; and gearing operatively connected to said rack-bar and said peg-trimmer, whereby the movement of said rack-bar in one direction will impart a rotary movement to said peg-trimmer, the complete movement of said rack-bar imparting movement to said trimmer in opposite directions and causing the entire cutting-surface of said trimmer to come into active use.

6. A trimming attachment for pegging-machines, comprising a work-support; a trimmer carried thereby and mounted to move in the plane of its cutting edge; and means for imparting an oscillatory movement to said trimmer, said trimmer trimming the pegs during its movement in both directions.

7. A trimming attachment for pegging-machines, comprising a work-support; a trimmer removably secured in said support, said trimmer being mounted to move in the plane of its cutting edge; and means for imparting an oscillatory movement to said trimmer, said trimmer trimming the pegs during its movement in both directions.

8. A trimming attachment for pegging-machines, comprising a work-support; a trimmer carried thereby; and means for imparting an oscillatory movement to said trimmer, said trimmer trimming the pegs during its movement in both directions.

9. A trimming attachment for pegging-machines, comprising a revoluble spur-gear, having its upper face on a horizontal plane, said face being provided with radially-extending recesses; a trimmer having top and bottom parallel faces, and having radially-extending lugs adapted to fit within said recesses, said trimmer having a thickness equal to the depth of said recesses, whereby said trimmer will be removably connected to said gear, and said gear will have a smooth upper surface; and a trimming edge formed concentrically within said trimmer, adjacent to the top edge thereof.

In witness whereof we have hereunto set our hands in the presence of two witnesses.

FRANCIS TOUSIGNANT.
PIERRE LARANGE.

Witnesses:
J. A. MARION,
HORACE G. SEITZ.